United States Patent [19]

Egraz et al.

[11] Patent Number: 5,432,239

[45] Date of Patent: Jul. 11, 1995

[54] A PROCESS FOR USING GRINDING AND/OR DISPERSING AGENT CONTAINING POLYMERS AND/OR COPOLYMERS PARTIALLLY NEUTRALIZED BY MAGNESIUM FOR AQUEOUS SUSPENSIONS OF MINERAL SUBSTANCES, TO BE USED IN PIGMENTARY APPLICATIONS

[75] Inventors: Jean-Bernard Egraz, Ecully; Jacques Mongoin, Champagne-au-Mont-d'or; Georges Ravet, Saint-Genis-les-Ollieres, all of France

[73] Assignee: Coatex S.A., Genay, France

[21] Appl. No.: 974,282

[22] Filed: Nov. 10, 1992

[30] Foreign Application Priority Data

Nov. 12, 1991 [FR] France ................................ 91 14138
Nov. 12, 1991 [FR] France ................................ 91 14139

[51] Int. Cl.$^6$ .............................................. C08F 8/42
[52] U.S. Cl. ............................ 525/330.2; 525/329.5; 526/240; 241/16
[58] Field of Search .......................... 51/293, 298, 309; 523/333; 524/425, 556; 525/330.2, 329.5; 526/240; 241/16

[56] References Cited

U.S. PATENT DOCUMENTS

| | | | |
|---|---|---|---|
| 4,775,420 | 10/1988 | Gonnet et al. | 524/431 |
| 4,840,985 | 6/1989 | Gonnet et al. | 106/447 |
| 4,845,191 | 7/1989 | Hautier | 106/447 |
| 4,868,228 | 9/1989 | Gonnet et al. | 523/333 |
| 5,181,662 | 1/1993 | Bousquet et al. | 106/465 |

*Primary Examiner*—Deborah Jones
*Attorney, Agent, or Firm*—Oblon, Spivak, McClelland, Maier, & Neustadt

[57] ABSTRACT

A grinding agent containing polymers and/or copolymers partially neutralized by magnesium, for aqueous suspensions of mineral substances to be used in pigmentary applications is disclosed.

A grinding agent composed of polymers and/or copolymers obtained by polymerization and/or copolymerization of acrylic and/or vinyl monomers containing acid groups, and in which the active acid sites are completely or partially neutralized to a degree of 40% to 60%, including terminals, using a neutralizing agent containing magnesium ions, and to a degree of up to 60% using a neutralizing agent containing monovalent ions is disclosed.

A procedure for grinding in an aqueous suspension using said agent, as well as the aqueous suspensions produced using said procedure and their applications to the fields of weight fillers, paper coating, paints, and plastics is also disclosed.

11 Claims, No Drawings

A PROCESS FOR USING GRINDING AND/OR DISPERSING AGENT CONTAINING POLYMERS AND/OR COPOLYMERS PARTIALLLY NEUTRALIZED BY MAGNESIUM FOR AQUEOUS SUSPENSIONS OF MINERAL SUBSTANCES, TO BE USED IN PIGMENTARY APPLICATIONS

BACKGROUND OF THE INVENTION

1. Field of the Invention

The present invention relates to a grinding and/or dispersing agent, a method of grinding and/or dispersing with such an agent and a dispersion containing said agent.

2. Discussion of the Background

For a long time, conventional practice has included the use of mineral substances such as calcium carbonates and titanium dioxide for the preparation of industrial products intended for paints, paper coating, fillers for rubbers and synthetic resins, and others.

However, since these mineral substances do not have a natural lamellar or laminated structure facilitating their splitting, as is the case for certain substances such as aluminum silicates, generally known as kaolin, the specialist must, in order to use them in the pigment field, transform them by grinding in a very fine aqueous suspension whose constituent grains are as small as possible, i.e., less than several microns.

Through the publications that have appeared in this area, the specialized literature reveals the importance and complexity of grinding in an aqueous medium of mineral substances, so as to obtain a quality of partial fineness permitting pigmentary applications. Thus, it is well known, in the special case of paper coating, that the coating material composed of mineral pigments such as kaolins, calcium carbonates, and titanium dioxides are placed in suspension in water, also contains binding agents and dispersants, as well as other additives such as thickening agents and coloring agents.

It is desirable to ensure that a suspension of this kind possesses low, stable viscosity for the length of time it is stored, so as to facilitate handling and use, and, similarly, has as high a mineral substance content as possible, in order to reduce the quantity of water handled. A suspension, ideally uniting all of these basic properties, would allow the skilled artisan to solve the well-known problems of grinding, storage, transport from the production site to the application site, and, finally, of transfer by pump during use.

Thus, to date those of skill in the art have been familiar with the use of grinding and/or aqueous dispersing agents for mineral particles formed by acrylic polymers and/or copolymers which are totally or partially neutralized by various neutralization agents (Patents Nos. FR2539137, FR2531444, FR2603042).

The specialist is also familiar with the use of a grinding and/or dispersing agent formed from the fraction of alkali acrylic polymers and/or copolymers totally neutralized by a single cation, and whose specific viscosity is between 0.3 and 0.8 (Patent No. FR2488814), or which is partially neutralized by a single cation such as sodium, potassium, lithium, or ammonium (EP0127388; EP0185458).

These various types of grinding and/or dispersing agents, according to prior art and other treatment or grinding procedures known to the artisan (EP0278880; FR2642415), make it possible to obtain aqueous suspensions of fine mineral particles, which have been thought until now, to be stable over time, but for which the user experiences some handling problems, since they are often stored for several days or weeks without stirring, and thus must deal with an increase in viscosity of the unstirred suspensions, called "the gel effect".

In fact, in prior art, the viscosity of the aqueous suspensions of mineral particles was generally measured using a Brookfield RVT-type viscosimeter at a temperature of 20° C. and a rate of rotation of 100 revolutions/minute:

(a) at the grinding apparatus outlet;
(b) after eight days of rest in the bottle and after preliminary stirring of the resting suspension.

These two measurement parameters did not make it possible to bring to light "the gel effect" of the aqueous mineral suspension, which is troublesome to the user, who must handle concentrated suspensions which have been stored for several days unstirred, and characterized by a Brookfield viscosity before stirring of more than 5,000 mPa.s, obtained by measuring at 10 revolutions/minute.

Faced with these problems, the present inventors have found that the aqueous mineral suspensions obtained according to prior art had high Brookfield viscosities, if the measurement was made after extended storage without stirring the suspension preliminarily, as is generally the case the user of these suspensions is faced with.

Based on this finding, the present inventors have developed a grinding and/or dispersing agent and a grinding procedure in the presence of this agent, which, surprisingly, make it possible to produce aqueous mineral suspensions meeting the aforementioned quality criteria.

Surprisingly, the objectives of the invention are achieved when between 40 and 60%, of the active acid sites of an acrylic polymer including terminals, are neutralized by a neutralization agent containing magnesium ions, while less than, or equal to 60% of the active acid sites of the polymer are neutralized by a neutralizing agent containing monovalent cations.

SUMMARY OF THE INVENTION

Thus, one object of the invention is to provide an improved grinding and/or dispersing agent.

Thus, another object of the invention is to supply an improved grinding and/or dispersing agent in an aqueous suspension of coarse mineral substances, without gel effect.

A further object of the invention is to supply a grinding procedure in an aqueous suspension of mineral particles.

The object of the present invention is provided for by an improved grinding and/or dispersing agent in an aqueous suspension of coarse mineral substances, making it possible to obtain an aqueous suspension of fine mineral particles and intended for pigmentary applications, such as an aqueous calcium carbonate suspension whose dry matter content is at least 70% by weight, in which the size of at least 90% of the essential particles is less than two $\mu$m after grinding, while the size of 60% of these particles is less than one $\mu$m.

The invention provides for a grinding procedure in an aqueous medium of coarse mineral substances in the presence of said water-soluble grinding agent. This procedure gives aqueous suspensions of mineral substances whose viscosity remains stable over time, even if stirring of the suspensions should not be continued, thereby ensuring significant ease of handling and use. This procedure is particularly well suited to grinding of an aqueous calcium carbonate suspension, whose dry matter content is at least 70% by weight, in which the size of at least 90% of the essential particles after grinding is less than two μm, while the size of at least 60% of these particles is less than one μm. Moreover, this invention concerns aqueous suspensions of mineral particles obtained by means of this procedure, and their applications.

These suspensions according to the invention, which are intended for pigmentary applications in which the size of at least 90% of the particles is less than two μm, and in which at least 60% of them measure less than one μm, have a low, stable viscosity over time, even when not stirred.

A final purpose of the invention is the use of these fine aqueous mineral suspensions in the fields of weight filler, paper coating, and paints, and, after potential removal of the aqueous phase, in the field of polymer materials.

These objectives are achieved through the use, in the grinding process according to the invention, of the invention agent, which is produced by polymerization and/or copolymerization of acrylic and/or vinyl monomers containing acid groups (carboxylic, sulfonic, phosphonic, phosphoric, etc.) and in which the active acid sites are completely or partially neutralized by implementing a rate of neutralization of the active acid sites of between 40 and 60%, terminals included, using a neutralizing agent containing magnesium ions, and by a neutralizing agent containing monovalent ions which are capable of neutralizing up to 60% of the active acid sites of the polymer and/or copolymer.

DETAILED DESCRIPTION OF THE PREFERRED EMBODIMENT

The grinding and/or dispersing agent according to the invention comprises, as previously stated, acrylic acidic polymers and/or copolymers, which are partially or completely neutralized. These acrylic polymers and/or copolymers are obtained from conventional radical polymerization procedures in the presence of polymerization regulators, such as hydroxylaminebased organic compounds and in the presence of polymerization catalysts such as peroxides and persalts, e.g., oxygenated water, persulfate, sodium hypophosphite, hypophosphorous acid, at least one of the following monomers and/or co-monomers: acrylic acid, methacrylic acid, itaconic acid, crotonic acid, fumaric acid, maleic anhydride acid, or, alternatively, isocrotonic acid, aconitic acid (cis or trans), mesaconic acid, sinapinic acid, undecylenic acid, angelic acid, canellic acid, or hydroxyacrylic acid, existing either as acid or partially neutralized salts, acrolein, acrylamide, acrylonitrile, the esters of acrylic and methacrylic acids, and, in particular, dimethylaminoethyl methacrylate, vinylpyrrolidone, vinylcaprolactam, ethylene, propylene, isobutylene, diisobutylene, vinyl acetate, styrene, emethylstyrene, and methyl vinyl ketone.

As a suitable polymerization medium, may be water, methanol, ethanol, propanol, isopropanol, the butanols, or mixtures of these, or, alternatively, dimethylformamide, dimethyl sulfoxide, tetrahydrofuran, acetone, methyl ethyl ketone, ethyl acetate, butyl acetate, hexane, heptane, benzene, toluene, xylene, mercaptoethanol, tertiododcaylmercaptan, thioglycolic acid and its esters, n-dodcaylomercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, and monopropylene glycol or diethyleneglycol ethers or mixtures of these latter.

The acidic polymerization product may potentially be distilled, then partially or completely neutralized using at least one neutralizing agent containing the magnesium ion, such that the degree of neutralization of the active acid sites effected by means of magnesium ions in between 40% and 60%, terminals included, and using a neutralizing agent containing a monovalent ion capable of neutralizing up to 60% of the active acid sites of said agent.

The monovalent neutralizing agent is chosen from the group comprising the alkali cations (in particular, sodium and lithium), ammonium, the primary, secondary, or tertiary aliphatic and/or cyclic amines, such as the ethanolamines (mono-, di-, tri-ethanolamine), mono- and diethylamine, cyclohexylamine, and methylcyclohexylamine.

The polymers and/or copolymers according to the invention generally have a specific viscosity of a maximum of 25, and preferably of at most 10.

This specific viscosity of the acrylic polymers and/or copolymers, symbolized by the letter "$\eta$," is determined in the following way.

A sample of the solution of the polymerization product is collected so as to obtain a solution corresponding to 2.5 g of dry polymer and to 50 ml of a 60 g/l solution of sodium chloride.

Next, a capillary viscosimeter with a Baume constant of 0.000105 placed in a bath thermostat-controlled to 25° C. is used to measure the flow time of a given volume of the aforementioned solution containing the alkaline polymer and/or copolymer, and the flow time of the same volume of aqueous solution of sodium chloride from which said polymer and/or copolymer is absent. The viscosity "$\eta$" can then be calculated by means of the following equation.

$$\eta = \frac{(\text{flow time of the polymer solution}) - (\text{flow time of the NaCl solution})}{\text{flow time of the NaCl solution}}$$

The capillary tube is generally chosen so that the flow time of the NaCl solution not containing the polymer and/or copolymer, will be approximately 90 to 100 seconds, thus giving very accurate specific viscosity measurements. The polymers and/or copolymers according to the invention can also be treated using any conventional means in order to isolate them as a fine powder, which can be used in this other form as a grinding agent.

In practice, the operation consisting of grinding the mineral substance to be refined consists in grinding the mineral material with a grinding substance into very fine particles in an aqueous suspension containing the grinding agent. An aqueous suspension of the mineral substance to be ground is formed, in which the initial size of the grains is at most 50 μm, in a quantity such that the concentration in dry matter of this suspension is at least 70% by weight.

The grinding substance, whose granulometry is advantageously between 0.20 millimeter and 4 millimeters, is added to the suspension of the mineral substance to be ground. The grinding substance generally exists as particles of materials as varied as silicon oxide, aluminum oxide, zirconium oxide or mixtures of these latter, as well as very hard synthetic resins, steels, etc. An example of the composition of grinding substances of this kind is given in Patent No. FR2303681, which describes grinding elements composed of from 30 to 70% by weight of zirconium oxide, 0.1 to 5% aluminum oxide, and from 5 to 20% silicon oxide. The grinding substance is preferably added to the suspension in a quantity such that the ratio by weight of the grinding material to the mineral substance to be ground is at least 2/1, this ratio preferably falling between the limits of 3/1 and 5/1.

The mixture of the suspension and of the grinding substance is then subjected to mechanical stirring, such as that generated in a conventional grinder incorporating microcomponents.

The grinding and/or dispersing agent according to the invention is also added to the mixture formed by the aqueous suspension of mineral substances and by the grinding substance, in a proportion of 0.2 to 2% by weight of the dried fraction of said polymers, in relation to the dry weight mass of the mineral substance to be fined.

The time required to achieve a high level of fineness of the mineral substance after grinding varies, depending on the nature and quantity of the mineral substances to be ground and on the stirring method used and the temperature of the medium during the grinding operation.

The mineral substances to be refined may come from very diverse sources, such as calcium carbonate and the dolomites, calcium sulfate, kaoline, and titanium dioxide, i.e., all mineral substances which must be ground to be usable in applications as various as paper coating, pigmenting of paints and coatings, fillers for rubbers and synthetic resins, imparting a dull finish to synthetic textiles, etc.

Thus, the application of the grinding and/or dispersing agent according to the invention allows the transformation, by grinding in an aqueous suspension containing a high concentration of dry matter, of coarse mineral substances into very fine particles, in which the size of at least 90% of these particles is always smaller than two $\mu$m, and in which the size of at least 60% is less than one $\mu$m; and this application makes it possible to obtain a suspension of very fine mineral substances whose viscosity is low and stable over time, without the gel effect.

Having generally described this invention, a further understanding can be obtained by reference to certain specific examples which are provided herein for purposes of illustration only and are not intended to be limiting unless otherwise specified.

EXAMPLE 1

This example involves the preparation of a suspension of coarse calcium carbonate subjected to grinding to refine it into a microparticulate suspension. To this end, a suspension of coarse calcium carbonate was prepared from a natural calcium carbonate having an average diameter of 50 micrometers, by using:

for Test No. 1, which illustrates prior art, a polyacrylic acid having a specific viscosity of 0.54 and corresponding to a molecular weight of ($M_w$) approximately 4,000, obtained by radical polymerization and completely neutralized by sodium hydroxide;

for Test No. 2, also illustrating prior art, the same polyacrylic acid (specific viscosity=0.54) as that used in the previous example, which is completely neutralized using sodium hydroxide and lime in a ratio corresponding to neutralization of the active acid sites, in the proportion of 70% by means of sodium and 30% by means of calcium;

for Test No. 3, still illustrating prior art, the same polyacrylic acid (specific viscosity=0.54) as that used in the previous tests, which is partially neutralized using sodium hydroxide at the rate of 66% of the active acid sites;

for Test No. 4, which illustrates the invention, the same polyacrylic acid (specific viscosity =0.54) as in the preceding examples, completely neutralized using sodium hydroxide and magnesium hydroxide in a ratio corresponding to neutralization of the active acid sites in a proportion of 50% by means of the sodium and 50% by means of the magnesium.

For each test, an aqueous suspension of calcium carbonate taken from the Orgon (France) deposit and having a granulometry of less than 10 microns was prepared.

This suspension had a dry matter concentration by weight of 76% of the total weight.

The grinding agent was added to this suspension in the quantities indicated in the following table, expressed as percent by dry weight of the weight of the dry calcium carbonate to be ground.

The suspension circulated in a Dyno-Mill grinder incorporating a stationary cylinder and a rotating pulse generator, in which the grinding substance was corundum balls having a diameter of between 0.6 millimeter and 1.0 millimeter.

The total volume taken up by the grinding substance was 1,150 cubic centimeters, and its weight, 2,900 g.

The grinding chamber had a volume of 1,400 cubic centimeters.

The circumferential speed of the grinder was 10 meters/second.

The calcium carbonate suspension was recycled at the rate of 18 liters/hour.

The outlet of the Dyno-Mill grinder was equipped with a 200-micron mesh separator allowing separation of the ground suspension and the grinding substance.

The temperature during each grinding test was kept at approximately 60° C.

Following the grinding operation (To), a sample of the pigmentary suspension, in which the size of 80% of the particles was less than one $\mu$m, was collected in a bottle, and the viscosity was measured using a Brookfield RVT viscosimeter at a temperature of 20° C. and a speed of rotation of 10 revolutions/minute using the suitable moving component.

After the suspension had rested in the bottle for eight days, the viscosity was measured by inserting into the unstirred bottle the suitable moving component of the Brookfield RVT viscoinmeter at a temperature of 20° C., and a speed of rotation of 10 revolutions/minute (AVAG viscosity: before stirring).

All experimental results are recapitulated in Table 1.

TABLE 1

| | GRINDING AGENT USED | | | | Brookfield Viscosity of Suspension (at 20° C. in mPa.s) | |
| --- | --- | --- | --- | --- | --- | --- |
| | NEUTRALIZATION | | | | | |
| Test No. | % of acid groups neutralized | Neutralizing Cation | Specific Viscosity | Consumption of agent in % dry/dry | To 10 T/mn | AVAG 8 days 10 T/mn |
| 1* | 100 | Na | 0.54 | 1.04 | 1400 | 17000 |
| 2* | 70/30 | Na/Ca | 0.54 | 1.09 | 1150 | 5160 |
| 3* | 66 | Na | 0.54 | 1.13 | 1480 | 5050 |
| 4** | 50/50 | Na/Mg | 0.54 | 1.13 | 1500 | 3400 |

*Prior Art
**Invention
AVAG: Measurement of the viscosity before stirring suspension.

A reading of Table 1 reveals that only the calcium carbonate ground using the invention agent (Test No. 4) has a Brookfield viscosity as measured at 10 revolutions/minute after eight days at rest (without preliminary stirring) of appreciably less than 5,000 mPa.s, while, to the contrary, all of the tests of the examples carried out using an agent according to prior art give viscosities of more than 5,000 mPa.s.

Thus, the grinding procedure according to the invention makes it possible to obtain the stability of the viscosity of calcium carbonate suspensions even before any stirring is undertaken.

EXAMPLE 2

A second group of tests (Test Nos. 5-13) involves preparation and grinding of an aqueous suspension of the same calcium carbonate at the same dry matter concentration and in the presence of the same polyacrylic acid possessing a specific viscosity of 0.54 and neutralized using various proportions of magnesium.

These tests were conducted based on the same experimental criteria as those in Example 1.

All experimental results appear in Table 2.

TABLE 2

| | GRINDING AGENT USED | | | | Brookfield Viscosity of Suspension (at 20° C. in mPa.s) | |
| --- | --- | --- | --- | --- | --- | --- |
| | NEUTRALIZATION | | | | | |
| Test No. | % of acid groups neutralized | Neutralizing Cation | Specific Viscosity | Consumption of agent in % dry/dry | To 10 T/mn | AVAG 8 days 10 T/mn |
| 5 | 70/30 | Na/Mg | 0.54 | 1.05 | 1570 | 5750 |
| 6** | 60/40 | Na/Mg | 0.54 | 1.03 | 1120 | 4076 |
| 7** | 55/45 | Na/Mg | 0.54 | 1.02 | 1250 | 3600 |
| 8** | 50/50 | Na/Mg | 0.54 | 1.13 | 1500 | 3400 |
| 9** | 45/55 | Na/Mg | 0.54 | 1.12 | 1480 | 3320 |
| 10** | 40/60 | Na/mg | 0.54 | 1.16 | 1390 | 1635 |
| 11 | 30/70 | Na/Mg | 0.54 | 1.29 | 1160 | 1730 |
| 12 | 20/80 | Na/Mg | 0.54 | 1.32 | 2000 | 2530 |
| 13** | 40/50 | Na/Mg | 0.54 | 1.17 | 1250 | 1800 |

**Invention
AVAG: Measurement of the viscosity before stirring suspension.

A reading of Table 2 reveals the rheological results yielded by the invention, and the fact that the use of the agent according to the invention makes it possible to cross the threshold of profitability during practical tests.

Indeed, two criteria are considered by the user, the economic and the rheological aspects. An excess quantity of the grinding agent entails an excess cost of production of the fine calcium carbonate suspensions.

Thus, consumption of the grinding and/or dispersing agent in the grinding operation based on the invention must not exceed approximately 1.2% of the dry dispersing agent in relation to the dry weight of the calcium carbonate, so as to give a suspension in which the size of 80% of the particles is less than one μm and the concentration of dry matter is 76%. Tests Nos. 6 to 10 thus establish the limits of the invention, as does Test No. 13.

As regards rheology, the user, who must handle concentrated suspensions stored for several days unstirred, agrees that a Brookfield viscosity of less than 5000 mpa.s measured at 10 revolutions/minute before stirring is acceptable.

These two criteria, i.e., the economic and rheological, dictate that the calcium carbonate suspensions meeting these requirements are those in Tests Nos. 6 to 10 and No. 13, i.e., those obtained by using, as grinding agent, a polyacrylic acid totally or partially neutralized by means of at least one neutralization agent containing magnesium ions, such that 40% to 60% of the active acid sites are neutralized by a neutralizing agent containing magnesium ions, and up to 60% of the active acid sites are neutralized by a neutralizing agent utilizing the monovalent cations.

EXAMPLE 3

This example (Test Nos. 14 to 16) involves the preparation and grinding of an aqueous suspension of the same calcium carbonate at the same dry matter concentration and in the presence of the same polyacrylic acid having a specific viscosity of 0.54 and neutralized by different neutralizing agents containing polyfunctional ions other than magnesium.

Thus, in Test No. 14 grinding is carried out using the same polyacrylic acid mentioned above, which is neutralized with sodium hydroxide and lime in a ratio corresponding to neutralization of the active acid sites, in a proportion of 55% by the sodium and 45% by the calcium. Test No. 15 involves the same polyacrylic acid neutralized by sodium hydroxide and zinc hydroxide in a ratio corresponding to the maximum solubility of the zinc hydroxide, i.e., a ratio corresponding to a neutralization of active acid sites in the proportion of 83% by the sodium and 17% by the zinc.

Similarly, Test No. 16 corresponds to the grinding agent obtained by neutralization effected by means of sodium hydroxide and aluminum hydroxide, in a ratio corresponding to the maximum solubility of the aluminum hydroxide, i.e., a ratio corresponding to a neutralization of the active acid sites in the proportion to 90% by the sodium to 10% by the aluminum.

These tests were conducted based on the same experimental criteria as those applied in Example 1.

All results are recorded in Table 3.

TABLE 3

| | GRINDING AGENT USED | | | Brookfield Viscosity of Suspension | |
| | NEUTRALIZATION | | | (at 20° C. in mPa.s) | |
| Test No. | % of acid groups neutralized | Neutralizing Cation | Specific Viscosity | Consumption of agent in % dry/dry | To 10 T/mn | AVAG 8 days 10 T/mn |
|---|---|---|---|---|---|---|
| 14 | 55/45 | Na/Ca | 0.54 | 1.38 | 1350 | 5700 |
| 15 | 83/17 | Na/Zn | 0.54 | 1.16 | 1400 | 6200 |
| 16 | 90/10 | Na/Al | 0.54 | 1.08 | 1550 | 11000 |
| 7 | 55/45 | Na/Mg | 0.54 | 1.02 | 1250 | 3600 |

AVAG: Measurement of the viscosity before stirring suspension.

A reading of Table 3 reveals that use of other neutralizing agents such as calcium (Test No. 14), zinc (Test No. 15) and aluminum (Test No. 16) yields calcium carbonate suspensions in which the Brookfield viscosity, measured at 10 revolutions/minute after eight days at rest and without preliminary stirring, is greater than 5000 mPa.s, while the use of a neutralizing agent such as magnesium gives a suspension whose viscosity is appreciably less than 5000 mpa.s (Test No. 7).

Thus, a reading of Table 3 reveals that the use of other polyfunctional neutralizing agents other than magnesium does not make it possible to obtain stable suspensions not exhibiting the gel effect.

EXAMPLE 4

This example (Test Nos. 17–19) involves the preparation and grinding of an aqueous suspension of the same calcium carbonate at the same dry matter concentration and in the presence of the same polyacrylic acid having a specific viscosity of 0.54 and neutralized in the proportion of 50% by the magnesium ion and of 50% by different neutralizing agents containing a monovalent cation.

These different neutralizing agents containing a monovalent cation are ammonium in Test No. 17, lithium in Test No. 18, and potassium in Test No. 19.

These tests were conducted using the same experimental criteria as those used in Example 1.

All results are recorded in Table 4.

TABLE 4

| | GRINDING AGENT USED | | | Brookfield Viscosity of Suspension | |
| | NEUTRALIZATION | | | (at 20° C. in mPa.s) | |
| Test No. | % of acid groups neutralized | Neutralizing Cation | Specific Viscosity | Consumption of agent in % dry/dry | To 10 T/mn | AVAG 8 days 10 T/mn |
|---|---|---|---|---|---|---|
| 17 | 50/50 | NH$_4$/Mg | 0.54 | 0.92 | 1040 | 4780 |
| 18 | 50/50 | Li/Mg | 0.54 | 1.17 | 2850 | 3600 |
| 19 | 50/50 | K/Mg | 0.54 | 1.08 | 1300 | 5475 |

AVAG: Measurement of the viscosity before stirring suspension.

A reading of Table 4 reveals that the sodium ion can be effectively replaced by monovalent neutralizing agents, such as the ammonium or the lithium ion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An agent for grinding or dispersing comprising a polymer selected from the group consisting of acrylic polymer, vinyl polymer, acrylic and vinyl copolymers and a mixture thereof:
wherein said polymer contains acid sites partially or completely neutralized by Mg ions and Na ions, wherein the active acid sites of said polymer are completely or partially neutralized, such that the percentage of active acid sites neutralized by magnesium ions ranges between 45 and 55%, including terminals, and such that up to 55% of the active acid sites of said agent are neutralized by sodium ions.

2. The agent of claim 1, wherein said active acid sites are totally neutralized such that the percentage of active acid sites neutralized by magnesium ions ranges between 45 and 55%, including terminals, and such that 55% to 45% of the remaining active acid sites are neutralized by sodium ions.

3. The agent of claim 1, wherein said acid sites are partially neutralized such that the percentage of the active acid sites neutralized by magnesium ions range between 45 and 55%, including terminals, and such that up to 55% of the remaining active acid sites are neutralized by a sodium ions.

4. The agent of claim 3, wherein said agent has a specific viscosity less than or equal to 25.

5. The agent of claim 4, wherein said agent has a specific viscosity less than or equal to 10.

6. The agent of claim 4, wherein said agent is in solution.

7. The agent of claim 4, wherein said agent in a powder.

8. A process for grinding an aqueous suspension of coarse mineral substances comprising:
   i) preparing an aqueous suspension of a coarse mineral substance and a grinding agent comprising a polymer selected from the group consisting of acrylic polymers, vinyl polymers, acrylic and vinyl copolymers, and a mixture thereof, wherein said polymer contains acid sites which are partially or completely neutralized by Mg ions and Na ions, wherein the active acid sites of said polymer are completely or partially neutralized, such that the percentage of said active acid sites neutralized by magnesium ions ranges between 45 and 55%, including terminals, and such that up to 55% of said active acid sites of said agent are neutralized by sodium ions;

iii) adding a grinding substance to said aqueous suspension; and iv) grinding mixture thus constituted.

9. The process of claim 8, wherein said grinding agent is added to said suspension in a proportion of from 0.2% to 2% by dry weight of said polymer, in relation to the dry weight of the mineral substance to be ground.

10. The process of claim 8, wherein said aqueous suspension of mineral substances to be ground comprises dry matter in a proportion of at least 70% by weight.

11. The process of claim 8, wherein the size of at least 90% of the particles in the ground mixture is less than two $\mu$m.

* * * * *

UNITED STATES PATENT AND TRADEMARK OFFICE
CERTIFICATE OF CORRECTION

PATENT NO. : 5,432,239
DATED : July 11, 1995
INVENTOR(S) : Jean-Bernard EGRAZ, et al.

It is certified that error appears in the above-indentified patent and that said Letters Patent is hereby corrected as shown below:

On the title page, Item [54] and Column 1, Lines 2-7, the title should read:

--PROCESS FOR USING GRINDING AND/OR DISPERSING AGENT CONTAINING POLYMERS AND/OR COPOLYMERS PARTIALLY NEUTRALIZED BY MAGNESIUM FOR AQUEOUS SUSPENSIONS OF MINERAL SUBSTANCES, TO BE USED IN PIGMENTARY APPLICATIONS--

Signed and Sealed this

Tenth Day of October, 1995

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,432,239
DATED : July 11, 1995
INVENTOR(S) : Jean-Bernard Egraz, et al It is certified that error appears in the above-indentified patent and that said Letters Patent is hereby corrected as shown below:

Column 3, line 37, "PREFERRED EMBODIMENT" should read --PREFERRED EMBODIMENTS--.

Column 3, line 60, "styrene, emethylstyrene" should read --styrene, α-methylstyrene--.

Column 6, line 64, "RVT viscoinmeter" should read --RVT viscosimeter--.

Column 7, Table 2, Test No. 10**, "Na/mg" should read --Na/Mg--.

Column 9, line 31, "5000 mpa.s" should read --5000 mPa.s--.

Column 10, line 6, "comprising" should read --comprising:--.

UNITED STATES PATENT AND TRADEMARK OFFICE
CERTIFICATE OF CORRECTION

PATENT NO. : 5,432,239
DATED : July 11, 1995
INVENTOR(S) : Jean-Bernard Egraz, et al It is certified that error appears in the above-indentified patent and that said Letters Patent is hereby corrected as shown below:

Column 10, line 42, "by a sodium ions" should read --by sodium ions--.

Column 10, line 49, "agent in a" should read --agent is a--.

Signed and Sealed this

Third Day of September, 1996

Attest:

Attesting Officer

BRUCE LEHMAN

Commissioner of Patents and Trademarks